INVENTOR.
JOHN C. CHUPA

May 12, 1959

J. C. CHUPA 2,885,733

METHOD AND APPARATUS FOR MANUFACTURING
ARTICLES FROM VINYL RESINS

Filed July 1, 1953

INVENTOR.
JOHN C. CHUPA
BY
ATTYS.

INVENTOR.
JOHN C. CHUPA
BY Ely, Frye & Hamilton
ATTYS.

United States Patent Office 2,885,733
Patented May 12, 1959

2,885,733

METHOD AND APPARATUS FOR MANUFACTURING ARTICLES FROM VINYL RESINS

John C. Chupa, Sandusky, Ohio, assignor to The Barr Rubber Products Company, Sandusky, Ohio, a corporation of Ohio Application July 1, 1953, Serial No. 365,443

5 Claims. (Cl. 18—26)

The present invention relates to the manufacture of flexible hollow articles from synthetic resins, particularly polyvinyl chloride and similar vinyl polymers and co-polymers which, when compounded with suitable plasticizers and other ingredients to constitute a charge compound, may be molded into final form as dolls, toys, and similar articles and which are further characterized by initial gelling of the charge compound to form a gelled skin when brought into contact with the surface of a heated mold, further setting upon the application of additional heat, and termination of skin-to-mold fusion upon the subsequent cooling of the mold.

In attempts to develop economical techniques for the production of molded articles from such synthetic resins, the efforts of the art have been directed to so-called rotary casting processes in which an amount of charge compound of relatively small volume is placed in a mold of greater volume, the mold being then rotated around one or a plurality of axes to cast or distribute the charge over the mold surface, heat being applied to gel and set the charge in its cast position. The great disadvantage of such casting methods has been the complexity and expense of equipment for commercial production on an automatic or semi-automatic continuous basis. Mechanism had to be provided to load and close the molds, thereupon rotate the molds about multiple axes, subject the molds to heating and cooling, and open the molds and remove the product, all of these operations being performed intermittently or continuously incident to translation of the molds between stations at which the various operations occurred.

It is the object of the present invention to improve upon the manufacture of hollow molded articles of polyvinyl chloride and co-polymers; for example, the co-polymer of vinyl chloride and vinyl acetate, by employing molding techniques and equipment wholly dissimilar to the rotary casting processes and the corresponding large, complex production machinery heretofore thought necessary for successful volume manufacture of such hollow molded articles. My invention greatly simplifies the manufacture of such articles and, most particularly, reduces overhead cost of production equipment.

My invention involves the technique of slush molding in which a hollow mold is fully charged and, upon at least partial settings of those portions of the charge adjacent the mold surfaces, the remainder of the charge is emptied from the mold, the mold being thereupon further processed to fully set the charge remaining in the mold. Slush molding has not heretofore been successfully adapted to the fabrication of hollow articles from vinyl polymers and co-polymers as contemplated by this invention.

Broadly, then, my invention embodies the discovery of modifications and refinements in the technique of slush molding which render such technique adaptable to the manufacture of such hollow articles, the outstanding advantage of the invention being the economies in production equipment which may thereby be effected.

The embodiment of the invention disclosed herein is intended for the production of small dolls and similar figures, but the invention may be employed for other hollow cast figures. It will be understood that many details of the disclosed embodiment are included in order that the invention may be thoroughly understood, but that variations or improvements in such details may be adopted within the scope of the invention as set forth in the appended claims.

The presently most preferable form of the invention embodies a turntable design, in which a number of what may be designated "mold charging units" are mounted for rotation from station to station on a turntable. However, it will be understood upon reading the details of the disclosure that the principles of the invention may be adapted to other general production arrangements, such as inclusion of a number of mold charging units in an array which may be serviced by a single worker, mold cooling or both mold heating and cooling operations being performed at other locations.

General organization

Figure 1:
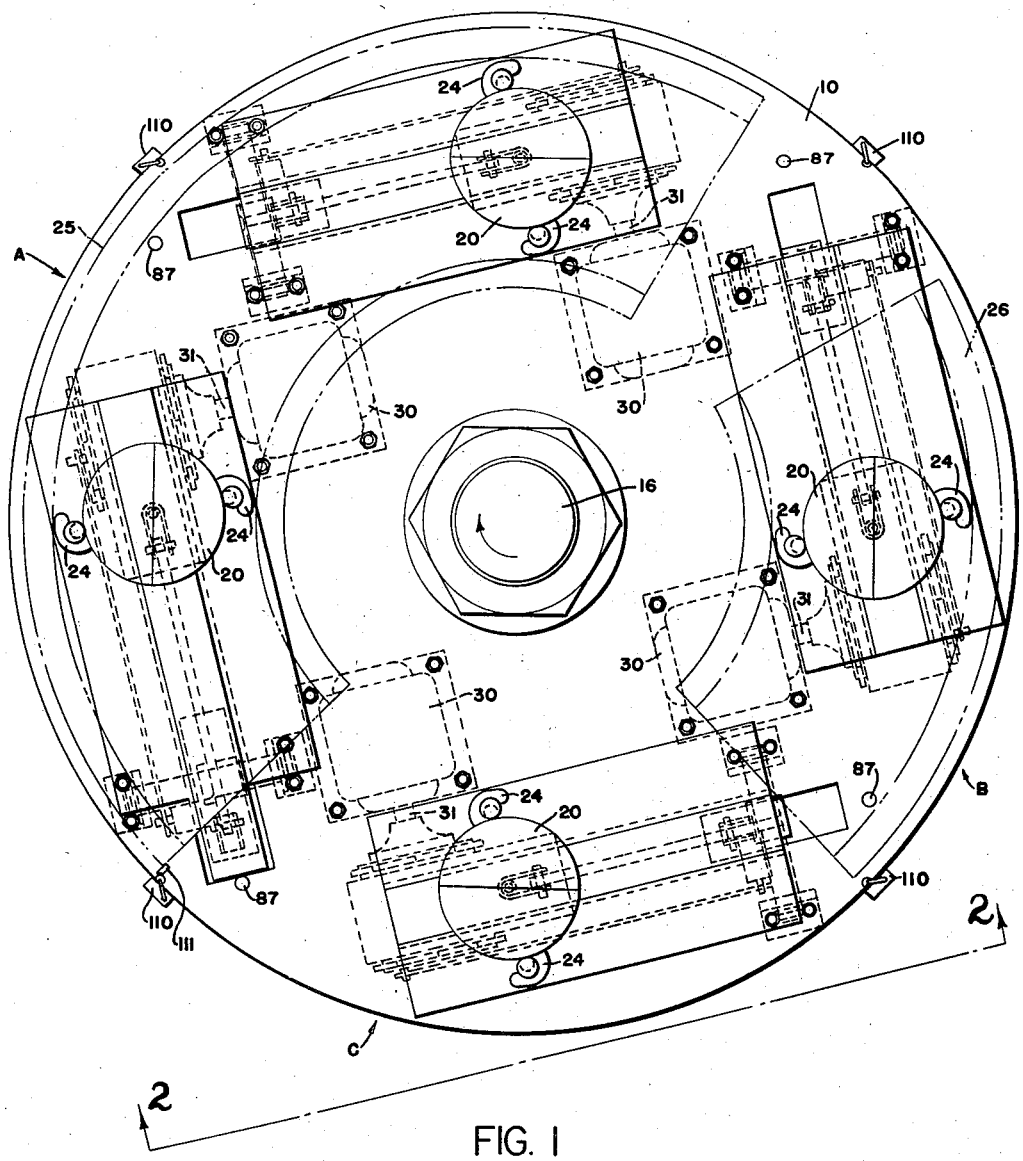
Figure 1 is a general plan view of one embodiment of the invention.
Figure 2:
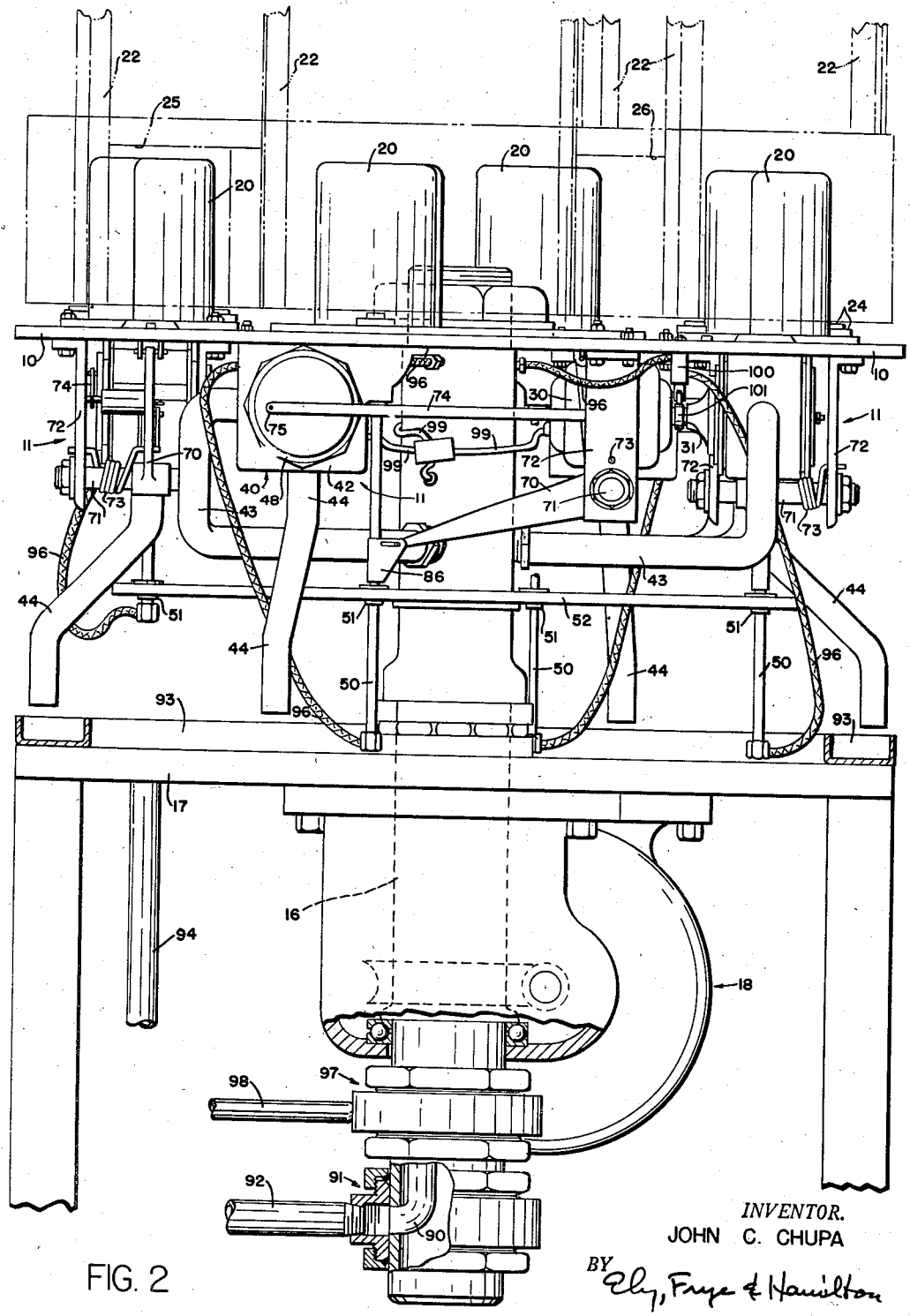
Figure 2 is a side view of the device shown in Figure 1 taken on line 2—2 in Figure 1.

As shown in Figures 1 and 2, then, the specific embodiment of the invention comprises turntable 10, upon which are carried a plurality of molds 20, in this particular instance, four in number. Associated with each mold, and mounted beneath the turntable 10, are a plurality of mold charging units generally designated as 11 and three of which may be seen in Figure 2. The turntable is supported by turntable shaft 16 for rotation above a support table 17, upon which the shaft 16 is mounted by suitable bearings. The turntable shaft 16 may be powered by a simple worm drive generally indicated at 18 and including a motor and a worm linkage between the motor and the shaft 16. It is to be noted that the molds 20 are merely moved around with the turntable 10 at a constant rate. Accordingly, the simple power drive illustrated perfectly serves the requirements of the illustrated installation embodying the present invention, no Geneva gear linkages or other relatively costly indexing equipment being necessary. Associated with the turntable 10, but supported from above by suitable means, such as struts 22, are two tunnels shown in phantom view in Figures 1 and 2. The first relatively long tunnel 25 may be termed the hot tunnel and contains a suitable mold heating means, such as an arrangement of gas burners. The details of construction of such heating tunnels will be familiar to those experienced in the field of heat treatment of molded resins and are not exhaustively disclosed herein because the particular tunnel construction is in no way critical to the invention.

The second tunnel 26, which may be termed the cold tunnel, comprises a water-spray tunnel for mold-cooling purposes. Such installations will also be familiar to those experienced in the molding of resins and need not be elaborated upon in greater detail. It may be mentioned, however, that by merely increasing the diameter of the turntable 10 so that mold charging units may be located radially outwardly from their illustrated positions, the radius and length of the tunnels 25 and 26 may be increased by any desired amount.

It will be noted that both tunnels 25 and 26 are open-bottomed and open-ended, allowing the molds successively to pass therethrough in their movement with the turntable 10. If desired, the upper surface of the turntable 10 may be beveled gradually outwardly from a point radially inside the location of the molds 20 in order to aid in drainage of water sprayed within the tunnel 26. Heat-trap flaps or similar expedients familiar to the art may be mounted at the ends of the tunnel 25 to decrease heat loss.

As indicated in Figure 1, the turntable installation may be viewed as comprising three stations. Station A, embracing generally the extent of tunnel 25, is the station at which the majority of operations occur. While each mold passes this station, it is pre-heated, charged, the charge is given an initial gel, the mold is partially emptied or slushed, and the remaining charge is thereupon heat-set.

Station B comprises the cooling station at which the mold and the mold charge are cooled down below the temperature of mold-to-charge fusing.

Station C represents the location at which the molds may be opened by an operator to remove the cast articles and may thereupon be closed to re-commence the cycle.

Mold charging units

Figure 3:
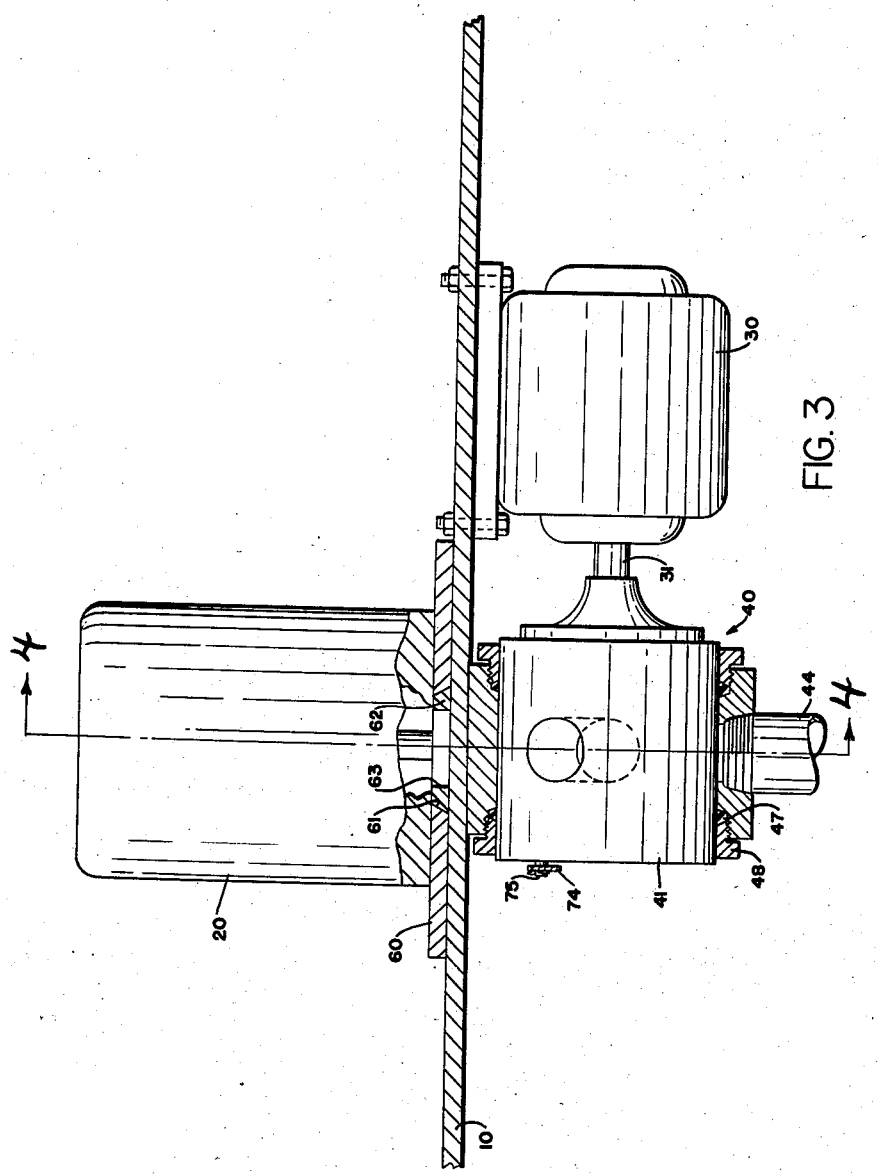
Figure 3 is a detail view taken in partial cross-section on line 3—3 in Figure 4.
Figure 4:
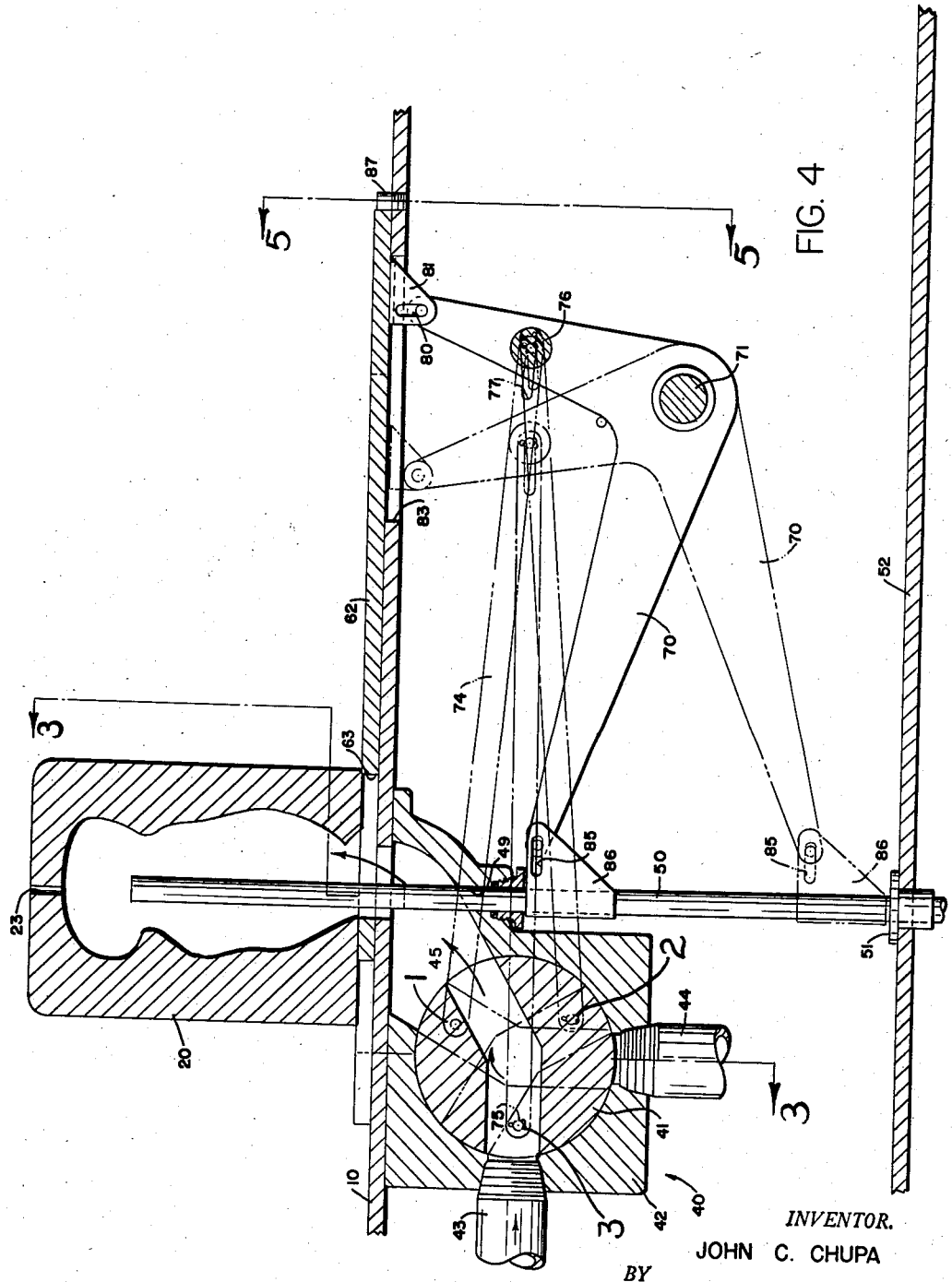
Figure 4 is a detail view of one of the mold charging units taken in cross-section on line 4—4 in Figure 3, certain parts in front of the plane of section being illustrated in phantom view.

Figures 3 and 4 illustrate in detail the construction of each of the mold charging units. Each mold charging unit comprises a unit-angular-movement power means 30, which may comprise a motor with a one-revolution clutch and reduction gearing or, more preferably, a self-contained powered control unit including a motor, reduction gearing and timing controls designed to move a driven shaft through a series of given angular increments at timed intervals upon each actuation, as is familiar to those in the field of production equipment controls. In the present case the powered control unit 30 is designed upon each actuation to rotate the shaft 31 a complete revolution in increments of one-third of a revolution, or 120°, with adjustable time delay between each increment. Mounted on the shaft 31 is a three-position valve generally indicated at 40. The casing of the valve 40 is mounted beneath turntable 10. The valve 40 comprises a large valve stem 41, which is drilled as shown in Figure 4 to provide a transverse passage having an angular bend at its center of approximately 120°. The casing 42 is drilled with two passages or ports which receive lines 43 and 44 and is provided with a third passage or port 45 which opens into the valve stem bore across a peripheral distance approximately twice as great as that of the passages 43 and 44. It will thus be seen that the valve may be set in one of three positions. In the first position, port 43, the charge feed line, is connected with port 45; in the second position port 45 is connected with line 44, the dump or exhaust passage; in the third position the valve is off, all passages being blanked from each other. Suitable sealing rings 47 are retained by large end nuts 48. The valve body or casing includes a small bore 49 which opens into the port 45 and is adapted to slidingly receive an air injection rod 50.

Figure 5:
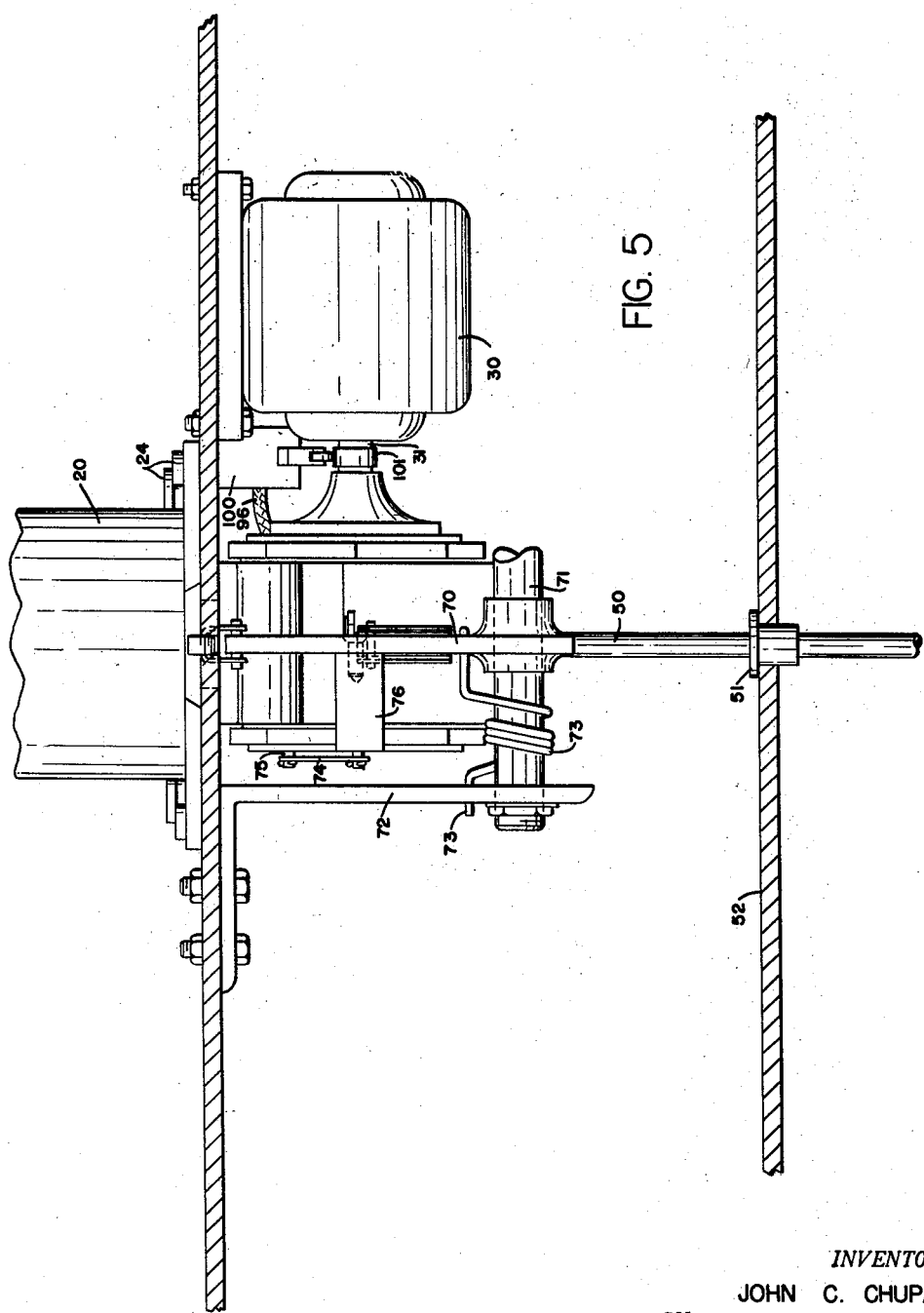
Figure 5 is a view taken on line 5—5 in Figure 4.

Associated with each mold and mold charging unit on the top side of the turntable 10 is a mold plate 60 having a beveled slot 61 formed thereon and adapted to receive a sliding gate 62. The gate 62 comprises a relatively long strip of metal having an elongated opening 63 formed at one end thereof. It will be noted that the mold 20 is supported directly on the mold plate 60, the sliding gate 62 moving back and forth across the gate 63 of the mold 20. The mold 20 is provided with a venting groove 23 (Figure 4) on the upper portion of its parting line and is removably clamped in position on its associated mold plate by suitable means such as the bayonet fastenings 24 (Figures 1 and 5).

A mechanical linkage is provided to actuate the sliding gate and the air injection rod in proper coordination with movements of the valve 40. This linkage includes a bell crank 70 supported on a shaft 71, which is in turn supported on the turntable 10 by suitable brackets 72. The bell crank 70 is constantly urged toward movement in a clockwise direction (as viewed in Figure 4) by a spring 73 extending between the bracket 72 and the upper arm of the bell crank. A link 74 is connected at one end to a pin 75 mounted on the valve stem 41 and at the other end to a large pin 76 mounted on the bell crank 70. A lost-motion slot 77 (Figure 4) at the bell crank end of the link 74 accommodates movement of the pin 75 from position 1 to position 2 (as labeled in Figure 4) without corresponding movement of the bell crank 70.

The upper arm of the bell crank 70 is provided with a pin which slidingly engages a slot 80 on a small bracket 81 affixed to the sliding gate 62 and extending through an opening 83 in turntable 10. The lower long arm of the bell crank 70 is provided with a pin which engages the slot 85 in a bracket 86 affixed to the air injection rod 50. A stop member 87 against which the sliding gate 62 abuts limits movement of the bell crank linkage in the clockwise direction (as viewed in Figure 4).

Supply and dump of mold charging units

The mold charging units rotate bodily with the shaft 16. The charge feed lines 43 may thus be coupled directly to a main charge feed line 90 carried within the shaft 16. The main charge feed line is in turn connected through a rotary union 91 with a charge supply line 92 leading from a suitable charge reservoir and pump means (not shown).

The charge dump lines 44 drain into a gutter 93 which is mounted on the support table 17. A drain line 94 leads from the gutter to a suitable reservoir (not shown) which may be the reservoir from which the charge supply line 92 is supplied.

The air injection rods 50 are supplied with air through the flexible lines 96 which are coupled to an air line (not shown) within the turntable shaft 16 which, through a suitable rotary union 97, communicates with an air supply line 98 leading from suitable air pump and accumulator means (not shown). Within the upper end 51 of each air injection rod is a conventional check valve (not shown) which prevents backward flow of fluid into the rod. The flexible air lines 96 lead through air valves 100 associated with each mold charging unit and actuated by the cams 101 on each shaft 31. The lower ends of the air injection rods 50 are slidingly supported by bushings 51 mounted in a plate 52 which is fixed to the turntable shaft 16.

Suitable slip rings (not shown) on the turntable shaft 16 pick up electric power for distribution through the cables 99 to the various electrically operated units in the assembly.

Operation

In order that the operation of the invention may be clearly understood, a complete cycle of operation of one mold charging unit will be described.

Associated with each mold injection unit is a small switch 110, mounted on the rim of the turntable 10. As the mold associated with each injection unit reaches a point well within the tunnel 25, this switch is tripped by a projection 111 extending from the side of the tunnel mouth. Tripping of this switch actuates the powered control unit 30 to commence automatic indexing of the valve stem 41 and the mechanical linkages associated therewith. The valve stem 41 which was previously in blanked position is indexed to the position shown in Figure 4, the end pin 75 being correspondingly positioned at position 1 as shown in Figure 4.

In this position, the charge is admitted through the valve and is fed into the now preheated mold under pressure, the portion of the charge contacting the inside surface of the mold being given an initial gel by the hot mold surface. Air trapped within the mold is vented through the vent groove 23 until all air is exhausted and the vent groove is blocked by the initially gelled charge which forms over the mouth of the groove.

After a time interval of several seconds, which time interval may be varied for different charge compounds and different size molds, the powered control unit 30 automatically indexes the valve 40 an additional 120° into dump position. When, and only when, the shaft 31 occupies the rotative position corresponding to this valve setting, the cam 101 on the shaft 31 depresses the air valve 100 to admit air to the air injection rod 50. This air is preferably under relatively low pressure to merely express the relatively ungelled portions of the charge out through the dump line 44, while avoiding any turbulence, agitation or aeration of this expressed portion of the charge.

After a suitable time interval, which may again be varied according to characteristics of the particular charge compounds and mold being employed, the valve 40 is indexed by the powered control unit 30 to its blank position, simultaneously closing the air valve 100.

It will be noted that in the initial feed position of the valve 40, the sliding gate 62 is in open position and the rod 50 is extended. Through the lost-motion connection 77, these positions of the sliding gate 62 and air injection rod 50 are maintained during advance of the valve 40 from the feed position to the dump position. As the valve 40 moves on to blanked position, the connecting link 74 is drawn leftward as viewed in Figure 4 to swing the bell crank 70 and close the gate 62 and withdraw the air injection rod 50. It will be noted that the portion of the gate 62 which covers the gate of the mold when the sliding gate 62 is in closed position is directly exposed to the hot tunnel heating elements when the sliding gate 62 is in open position. Thus, this portion of the gate serves to give a quick initial gel to the residuum of relatively non-gelled charge which tends to drain down the sides of the mold 20 immediately following emptying of the mold.

The above described operations all take place in the first portion of the travel of the mold through the tunnel 25. During the remaining part of the cycle the mold simply continues to be transported through the tunnel to receive additional heat for final gelling or curing. The mold thereupon passes to the cold tunnel 26 where it is cooled by a water spray. The cold mold is thereupon presented to the operator at station C, who removes the mold, parts the mold, removes the cast article therefrom, reassembles the mold, and refastens the mold to the mold plate 60.

As previously pointed out, various alternatives to the specific embodiment of the invention herein described may be employed. For example, air injection is preferable but not essential. Also, rather than mounting the mold charging units on a turntable for translation thereby, they may be merely mounted in a fixed array, mold heating and/or cooling operations being done at other locations to and from which the molds are manually shifted.

Still more radical alternatives are possible. The molds may, for instance, be mounted for movement between an initial preheat position in which the mold gates are upward to a second final heat position in which they are downward, the molds being thus charged and discharged by gravity, although such an arrangement sacrifices some of the advantageous simplicity of the completely non-pivoting molds of the illustrated embodiment. It will be seen that none of these possible alternatives depart from the cycle of steps broadly contemplated by the present invention, and the scope of the invention is accordingly not to be restricted to details of the illustrated embodiment but is to be defined by the following claims.

What is claimed is:

1. The method of making hollow articles from a liquid mixture of a vinyl resin and a plasticizer therefor comprising the steps of pre-heating a hollow sectional mold, filling said pre-heated mold with a charge of said mixture to cause establishment of a viscosity gradient in said charge ranging from hghest viscosity adjacent surfaces of said mold to progressively lower viscosity at points progressively more remote from said surfaces, porting said mold at its bottom whereby least viscous portions of said charge slush out of said mold, closing said port whereby downwardly flowing portions of said charge of intermediate viscosity are trapped above said port, applying additional heat to portions of said charge remaining in said mold to fuse the same, cooling the mold, opening the mold and removing the cast article therefrom.

2. A machine for the manufacture of hollow cast articles comprising at least one hollow sectional mold having a gate, a mold charging unit associated with said at least one hollow sectional mold, said mold charging unit comprising means to mount said mold with said gate downwardly presented, port means below said gate, gate enclosure means mounted for movement on said mold mounting means into and out of register with said mold gate and said port means, valve and linkage means operatively coordinated for feeding a charge to said port when said gate closure means is in open position, for thereupon opening said port to discharge when said gate closure means is in open position, for thereupon closing said gate closure means whereby said mold may be preheated and thereupon automatically said mold is charged, said charge is allowed to assume an initial surface gel, and relatively non-gelled portions of said charge are slushed out preparatory to further heat-setting of the charge remaining in said mold.

3. A machine for the manufacture of hollow cast articles comprising at least one hollow sectional mold having a gate, a mold charging unit associated with said at least one hollow sectional mold, said mold charging unit comprising means to mount said mold with said gate downwardly presented, port means below said gate, gate closure means mounted for movement on said mold mounting means into and out of register with said mold gate and said port means, an air blowout rod having an air outlet at its upper end, said rod being mounted for reciprocation of said upper end through said gate and into and out of said mold, valve and linkage means operatively coordinated for feeding a charge to said port when said gate closure means is in open position, for thereupon opening said port to discharge when said gate closure means is in open position and said upper end of said air blowout rod is in raised position, and for thereupon withdrawing said upper end of said air blowout rod and close said gate closure means whereby said mold may be preheated and thereupon automatically said mold is charged, said charge is allowed to assume an initial surface gel, relatively non-gelled portions of said charge are slushed out and said mold port is closed preparatory to further heat-setting of the charge remaining in said mold.

4. A machine for the manufacture of hollow cast articles comprising at least one hollow sectional mold having a gate, a mold charging unit associated with said at least one hollow sectional mold, said mold charging unit comprising means to mount said mold with said gate downwardly presented, port means below said gate, gate closure means mounted for movement on said mold mounting means into and out of register with said mold gate and said port means, said port means communicating with a valve bore, a charge feed passage communicating with said valve bore, a dump passage communicating with said valve bore, a valve stem received in said valve bore, said valve stem having passage means therein so placed as to put said charge feed passage and said port means in communication in a first position of said valve, to put said dump passage and said port means in communication in a second position of said valve and to blank all valve passages in a third position of said valve, linkage means between said valve and said gate closure means to open said gate closure means in said first and second positions of said valve and to close said gate closure means in said third position of said valve.

5. A machine for the manufacture of hollow cast articles comprising at least one hollow sectional mold having a gate, a mold charging unit associated with said at least one hollow sectional mold, said mold charging unit comprising means to mount said mold with said gate downwardly presented, port means below said gate, gate closure means mounted for movement on said mold mounting means into and out of register with said mold gate and said port means, an air blowout rod having an air outlet at its upper end, said rod being mounted for reciprocation of said upper end through said gate and into and out of said mold, said port means communicating with a valve bore, a charge feed passage communicating with said valve bore, a dump passage communicating with said valve bore, a valve stem received in said valve bore, said valve stem having passage means therein so placed as to put said charge feed passage and said port means in communication in a first position of said valve, to put said dump passage and said port means in communication in a second position of said valve and to blank all valve passages in a third position of said valve, linkage means between said valve and said gate closure means and air blowout rod to open said gate closure means and extend said air blowout rod into said mold in said first and second positions of said valve and to close said gate closure means and retract said air blowout rod out of said mold in said third position of said valve.

References Cited in the file of this patent

UNITED STATES PATENTS

| | | |
|---|---|---|
| 1,250,803 | Cook | Dec. 18, 1917 |
| 1,362,978 | Winter | Dec. 21, 1920 |
| 1,699,592 | Kadow | Jan. 22, 1929 |
| 1,725,144 | Kadow | Aug. 20, 1929 |
| 1,811,086 | Kasch | June 23, 1931 |
| 1,856,352 | Morris et al. | May 3, 1932 |
| 2,209,877 | Ferngren | July 30, 1940 |
| 2,329,288 | Miller | Sept. 14, 1943 |
| 2,588,571 | Porter | Mar. 11, 1952 |

UNITED STATES PATENT OFFICE

CERTIFICATE OF CORRECTION

May 12, 1959

Patent No. 2,885,733

John C. Chupa

It is hereby certified that error appears in the printed specification of the above numbered patent requiring correction and that the said Letters Patent should read as corrected below.

Column 6, line 1, for "hghest" read -- highest --; line 16, strike out "en-".

Signed and sealed this 8th day of September 1959.

(SEAL)
Attest:

KARL H. AXLINE
Attesting Officer

ROBERT C. WATSON
Commissioner of Patents